United States Patent

[11] 3,581,591

| [72] | Inventors | Brandt F. Ziegler;<br>Christian Berger, both of North Canton, Ohio |
|---|---|---|
| [21] | Appl. No. | 838,731 |
| [22] | Filed | July 1, 1969 |
| [45] | Patented | June 1, 1971 |
| [73] | Assignee | The Hoover Company<br>North Canton, Ohio |

[54] POWER-PROPELLED SUCTION CLEANER
6 Claims, 16 Drawing Figs.

[52] U.S. Cl. ................................................ 74/377
[51] Int. Cl. ................................................ F16h 3/14
[50] Field of Search .................................. 74/376, 377, 404; 192/21, 48.9, 49, 51

[56] References Cited
UNITED STATES PATENTS

| 1,193,726 | 8/1966 | Snow | 192/48.9 |
| 3,071,021 | 1/1963 | Miller | 74/377 |
| 3,202,004 | 8/1965 | Field | 74/404 |
| 3,204,478 | 9/1965 | Thelin | 74/377 |
| 3,207,251 | 9/1965 | Putnam et al. | 192/49 |
| 3,392,595 | 7/1968 | Menasoff et al. | 74/377 |

*Primary Examiner*—C. J. Husar
*Attorneys*—Alfred G. Gross and E. A. Johnson

ABSTRACT: An upright suction cleaner includes an electric motor for supplying torque to a reversible variable-speed transmission on the cleaner. The transmission includes a driven shaft which is rotatably driven by the motor. First and second power takeoff means are positioned in spaced-apart relationship on the driven shaft for rotation relative thereto. A clutch is positioned on the driven shaft between the spaced-apart power takeoff means. The clutch is rotatable with the driven shaft and is shiftable axially relative to the driven shaft for selectively drivingly engaging either the first or second power takeoff means. A manually actuatable operating device is connected with the clutch for selectively shifting the clutch into engagement with either the first or second power takeoff means. The first power takeoff drives an output shaft in a first rotational direction through a first gear train, and the second power takeoff shaft drives the output shaft in an opposite rotational direction through a second gear train.

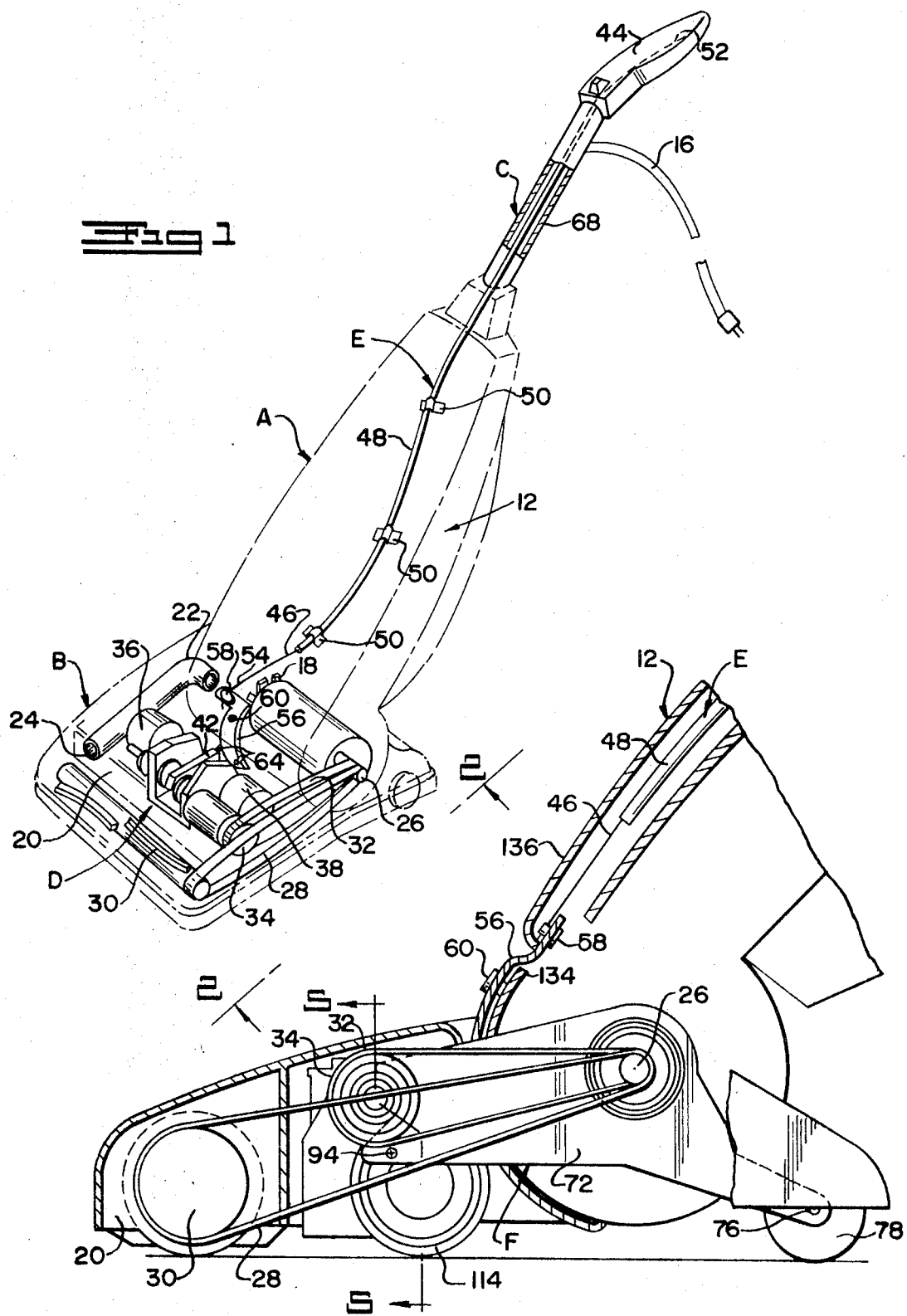

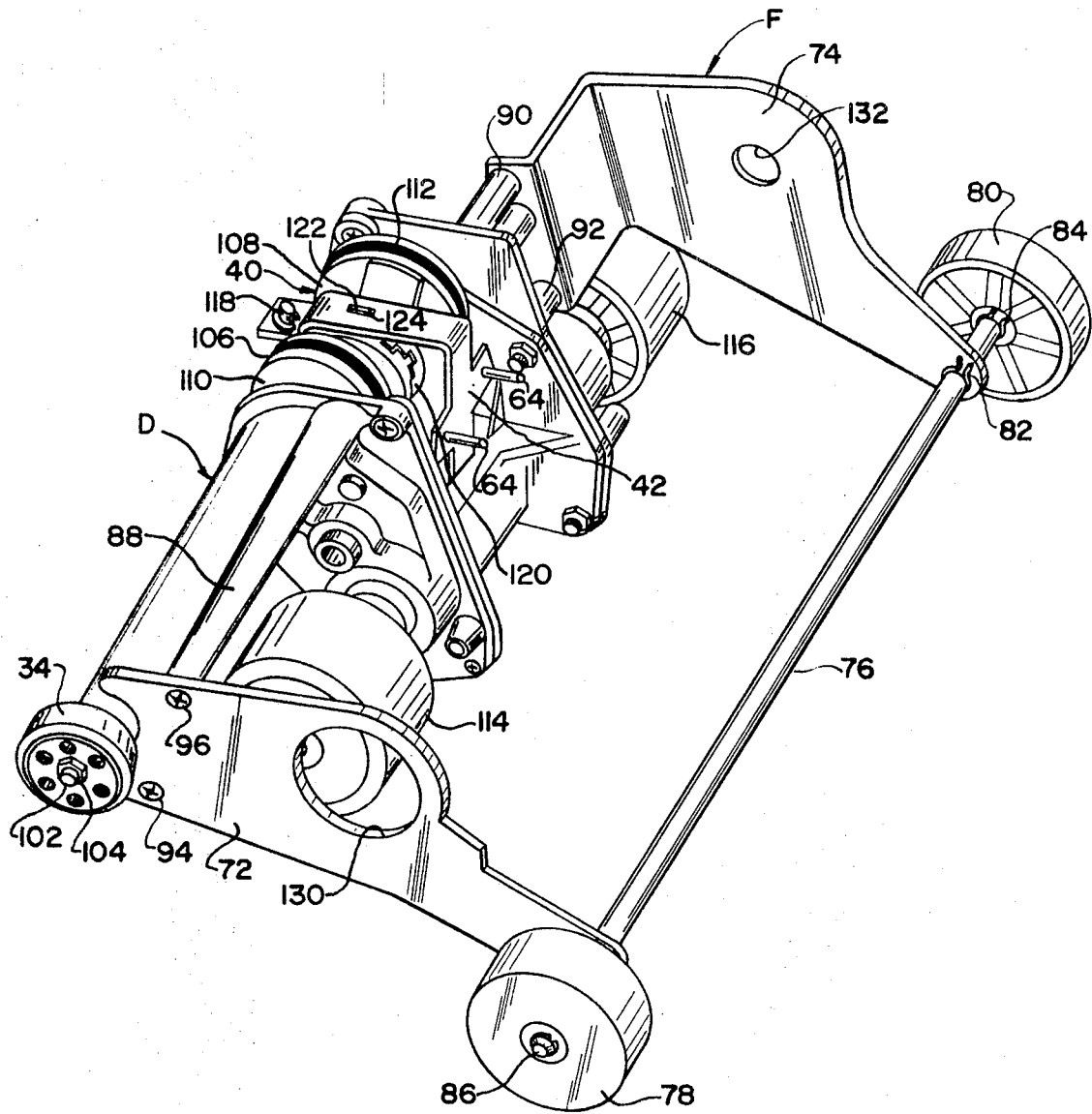

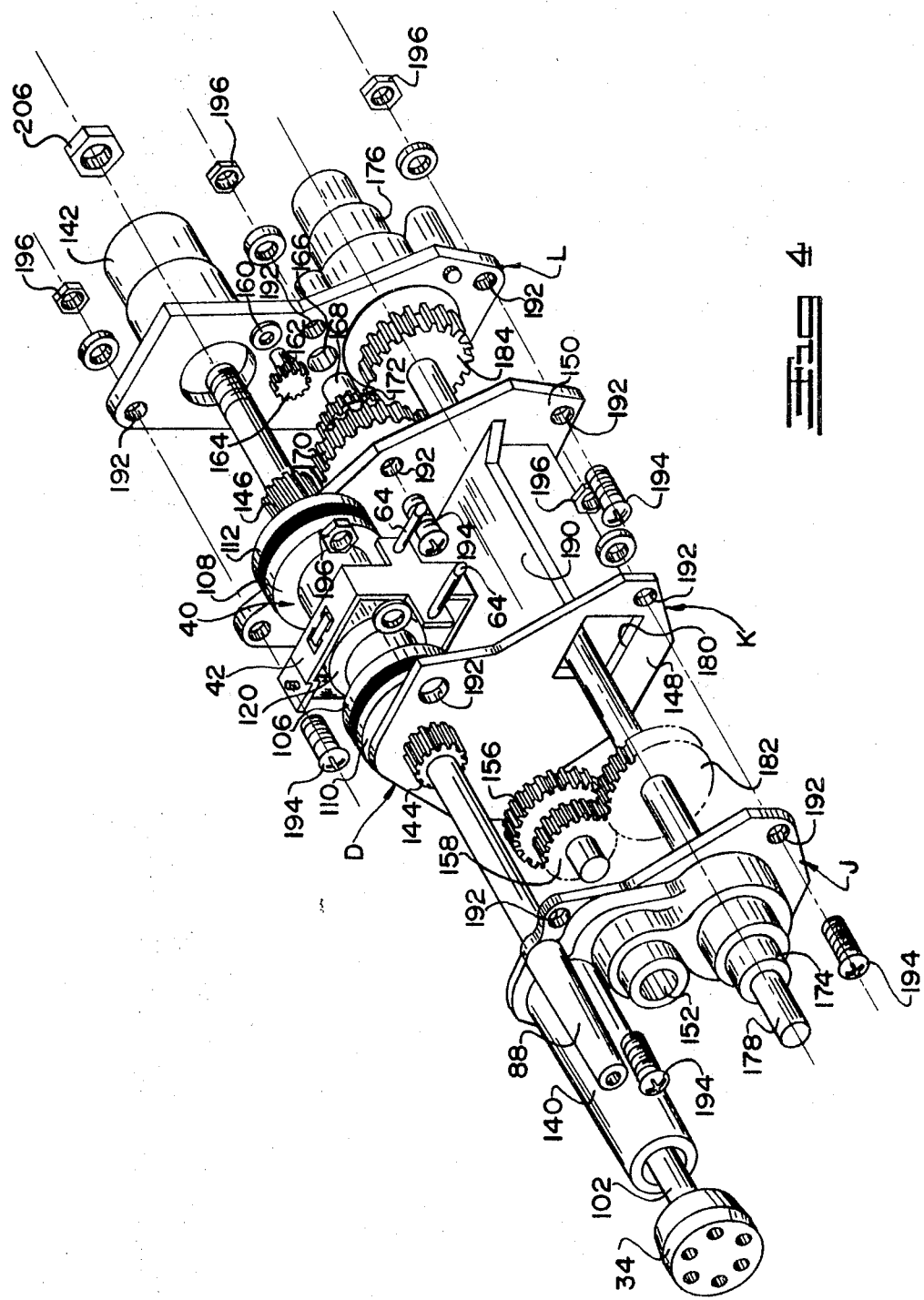

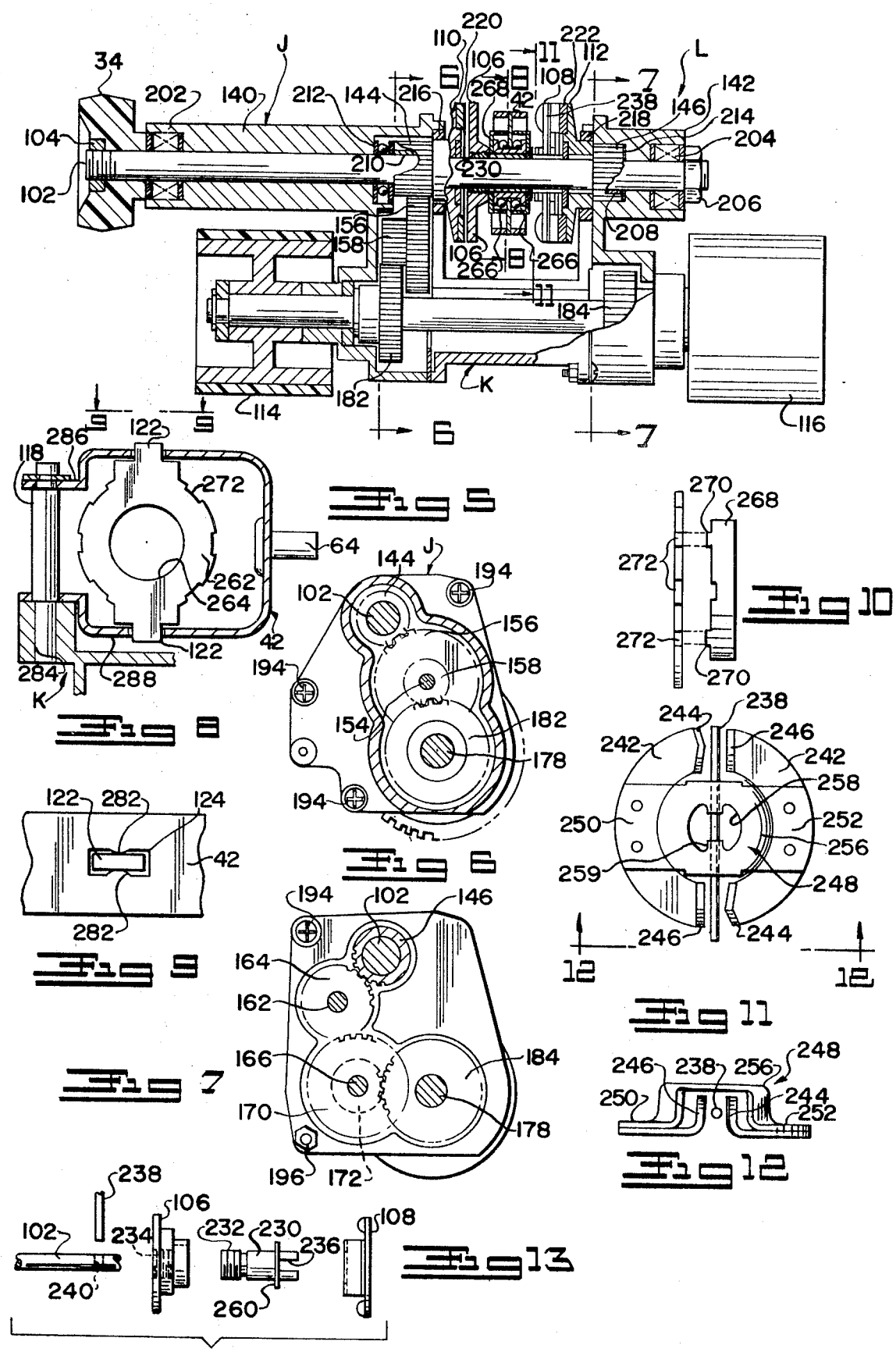

3,581,591

POWER-PROPELLED SUCTION CLEANER

BACKGROUND OF THE INVENTION

This application pertains to the art of torque-transmitting transmissions and more particularly to reversible variable-speed friction disc transmissions. The invention is particularly applicable to use in propelling an upright suction cleaner and will be described with particular reference thereto although it will be appreciated that the invention has broader applications and may be used for propelling other devices such as lawnmowers and wheelbarrows or the like.

Power-propelled appliances have previously been proposed in which a person grasping a handle of the appliance operates a control for engaging a transmission to provide driving torque to surface-engaging wheels. Previous devices of this type have been extremely complicated and bulky. The transmissions used in previous devices of this type have been very expensive to manufacture and somewhat undependable in operation so that rather frequent repair was necessary. Also, the complex nature of previous devices of this type have made them very heavy and of a large size so that they were not well adapted for use with small appliances such as upright suction cleaners.

It would be desirable to have a torque-transmitting transmission for use in small appliances which was very simple and economical to manufacture and assemble. It would also be desirable to have such a transmission which was extremely compact and lightweight.

SUMMARY OF THE INVENTION

In accordance with the present invention, a reversible, variable-speed torque-transmitting transmission is provided with a rotatable driven shaft. Spaced-apart first and second power takeoff means are positioned on the driven shaft for rotation relative thereto. A friction disc type of clutch is positioned on the driven shaft between the spaced-apart power takeoff means. The clutch device is rotatable with the driven shaft and is shiftable axially of the driven shaft. A manually actuatable operating means is connected with the clutch device for selectively shifting it axially of the driven shaft into engagement with either the first or second power takeoff means so that torque is selectively transferred from the driven shaft to either of the first or second power takeoff means through the clutch device.

In a preferred arrangement, the transmission is provided with an output shaft which is drivingly connected with the first and second power takeoff means through first and second gear trains. The output shaft is driven in a first rotational direction by the first power takeoff means and first gear train, and is rotatably driven in an opposite direction by the second power takeoff means and second gear train. In accordance with a further aspect of the invention, the first and second gear trains are enclosed within housings so that they are completely separated from the clutch device. With such an arrangement, material worn from the clutch faces cannot enter the gear train housings and interfere with smooth operation of the gears. In the preferred arrangement, a bearing is interposed between the clutch device and the clutch actuator so that the clutch device may rotate relative to the actuator. Lateral movement of the actuator causes the bearing to transmit thrust to the clutch device axially of the driven shaft to engage the clutch with the first or second power takeoff means.

It is a principle object of the present invention to provide a torque-transmitting transmission which is economical to manufacture and simple to assemble.

It is a further object of the present invention to provide a torque-transmitting transmission which is very compact and light in weight.

It is also an object of the present invention to provide a torque-transmitting transmission which is reversible and contains a minimum number of parts.

BRIEF DESCRIPTION OF THE DRAWING

The invention may take physical form in certain parts and arrangements of parts, preferred embodiments of which will be described in detail in this specification and illustrated in the accompanying drawings which form a part hereof.

FIG. 1 is a diagrammatic perspective illustration of an upright suction cleaner having the present invention incorporated therein;

FIG. 2 is a side, elevational, partial cross-sectional view looking in the direction of arrows 2-2 of FIG. 1;

FIG. 3 is a perspective view of a wheeled trolley on which the transmission of the present invention is mounted;

FIG. 4 is a partially exploded perspective illustration of the improved torque-transmitting transmission of the present invention;

FIG. 5 is an elevational cross-sectional view of the improved transmission of the present invention looking generally in the direction of arrows 5-5 of FIG. 2;

FIG. 6 is an elevational cross-sectional view looking in the direction of arrows 6-6 of FIG. 5;

FIG. 7 is an elevational cross-sectional view looking in the direction of arrows 7-7 of FIG. 5;

FIG. 8 is an elevational cross-sectional view looking in the direction of arrows 8-8 of FIG. 5 with portions omitted for clarity of illustration;

FIG. 9 is a top plan view looking in the direction of arrows 9-9 of FIG. 8;

FIG. 10 is a front elevational view of a portion of the actuator device constructed in accordance with the present invention;

FIG. 11 is an elevational cross-sectional view looking in the direction of arrows 11-11 of FIG. 5 with portions omitted for clarity of illustration;

FIG. 12 is a top plan view looking in the direction of arrows 12-12 of FIG. 11;

FIG. 13 is an exploded view of portions of the clutch device constructed in accordance with the present invention;

DESCRIPTION OF THE PREFERRED EMBODIMENT

Figure 14:
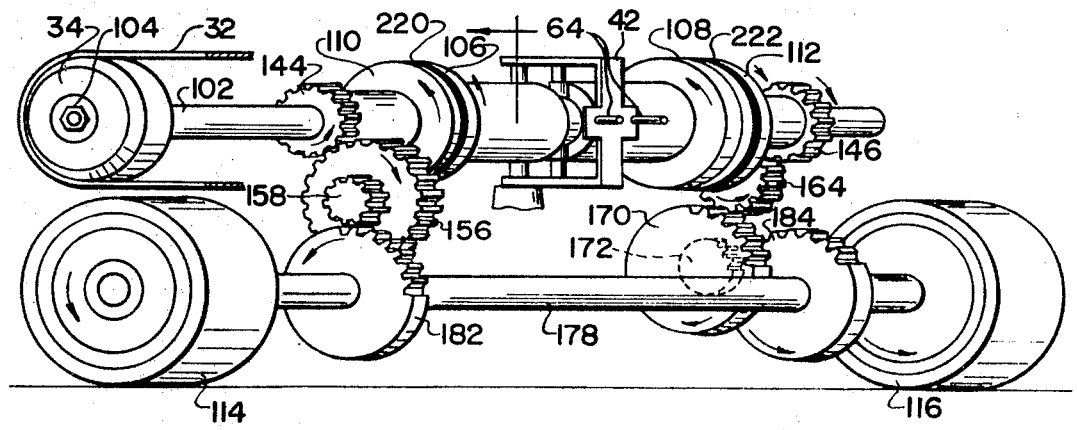
FIG. 14 is a diagrammatic perspective illustration showing the improved transmission of the present invention in a forward driving condition.

Referring now to the drawings, wherein the showings are for purposes of illustrating a preferred embodiment of the invention and not for purposes of limiting same, FIG. 1 shows an upright suction cleaner A having main housing portion B and handle assembly C. Handle assembly C includes a bag and motor housing 12 in which a dirt-collecting bag may be positioned. The power portion of bag housing 12 contains an electric motor 14 to which electric current is supplied through a suitable conductor 16. Motor 14 includes a fan 18 for drawing a suction in bag chamber 12 which communicates with nozzle 20 on main housing B through conduit 22. Conduit 22 has an inlet 24 communicating with suction nozzle 20. Motor 14 includes a rotatable output shaft 26 drivingly connected by belt 28 with surface-contacting agitator 30 rotatably mounted in suction nozzle 20. Main housing B includes a torque-transmitting transmission D which is drivingly connected with output shaft 26 of motor 14 through belt 32 and pulley 34. Torque-transmitting transmission D is drivingly connected with surface-contacting drive wheels 36 and 38 for propelling suction cleaner A over a surface to be cleaned. Transmission D includes clutch means 40 connected with actuator 42 for selectively engaging clutch 40.

Handle assembly C includes handgrip 44 which is mounted for reciprocating movement on handle assembly C. A bowden wire E, which includes a spring steel wire 46 slidably encased within a spiral wire casing 48, is secured to the interior front surface of bag housing 12 as by clamps 50. Clamps 50 may be adhesively attached to the inner front surface of bag housing 12 or secured thereto by screws, rivets or other suitable means. One end 52 of wire 46 is attached internally of handgrip 44 and the other end 54 is attached to lever 56 by suitable bolt 58. Lever 56 is connected to the exterior front bottom wall of bag housing 12 by a pivot pin 60. Lever 56 extends between pins 64 of clutch actuator 42. Reciprocating movement of handgrip 44 relative to handle assembly C causes longitudinal motion of wire 46 relative to casing 48 and handle assembly C so that lever 56 rotates on pivot 60. Pushing movement on handgrip 44 rotates lever 56 counterclockwise about pivot 60 for cooperation with pins 64 on actuator 42 and engages clutch 40 to transmit torque to wheels 36 for propelling cleaner A in a forward direction. Pulling movement on handgrip 44 causes lever 56 to pivot clockwise about pivot 60 and cooperate with pins 64 on actuator 42 to engage clutch 40 and provide driving torque to wheels 36 for propelling cleaner A in a rearward direction. Bowden wire E extends trough tubular handle portion 68 of handle assembly C to connect with handgrip 44.

In accordance with the invention, suction cleaner A has a power-driven wheeled trolley F as shown in FIG. 3. Trolley F includes spaced-apart sideplates 72 and 74. A shaft 76 extends through suitable holes formed in sideplates 72 and 74, and surface-contacting wheels 78 and 80 are rotatably mounted on the ends of shaft 76 exteriorly of sideplates 72 and 74. C-shaped spring retainers as at 82 fit into circumferential grooves in shaft 76 for holding shaft 76 against longitudinal movement relative to sideplates 72 and 74. Similar retainers as at 84 may be used to hold wheels 78 and 80 on shaft 76 in cooperation with friction retainers as at 86. Transmission D may have a die-cast aluminum housing which includes bosses as at 88, 90 and 92 having threaded bores formed axially therein. Sideplates 72 and 74 are formed with suitable holes through which screws such as 94 and 96 may extend into the threaded bores in the bosses. Sideplates 72 and 84 are then connected together in spaced-apart relationship by shaft 76 and transmission D. Pulley 34 is nonrotatably secured to the end of a rotatable shaft 102 as by nut 104. Pulley 34 and shaft 102 are rotatably driven by belt 32 from output shaft 26 of motor 14 as described with reference to FIG. 1. Clutch 40 is positioned on shaft 102 for rotation therewith and for limited movement axially thereof. Clutch 40 includes spaced-apart opposed friction discs 106 and 108 which are positioned adjacent power takeoff friction discs 110 and 112 rotatably mounted on transmission D independent of shaft 102. Power takeoff friction discs 110 and 112 are drivingly connected through gear trains to surface-engaging wheels 114 and 116 which are nonrotatably secured to the ends of a shaft rotatably mounted on the housing of transmission D. Clutch actuator 42 is pivotally connected with the housing of transmission D by pivot pin 118. A bearing 120 surrounds clutch 40 so that clutch 40 may rotate relative to bearing 120 and actuator 42. Bearing 120 is also a thrust bearing so that lateral movement of bearing 120 transmits lateral force to clutch 40. Actuator 42 is connected with bearing 120 as by arms 122 attached to bearing 120 and extending through a rectangular hole 124 in actuator 42. Movement of actuator 42 to the left in FIG. 3 causes clutch disc 106 to engage power takeoff disc 110 and transmit driving torque to wheels 114 and 116 in a direction to propel suction cleaner A forwardly. Pivotal movement of actuator 42 on pivot pin 118 to the right in FIG. 3 causes clutch disc 108 to engage power takeoff disc 112 and drives wheels 114 and 116 in a direction to propel cleaner A rearwardly. Sideplates 72 and 74 include holes 130 and 132 for pivotally attaching main housing B and handle assembly C to trolley F in a manner which will be more fully described as the description proceeds.

Lever 56 is bent outwardly and extends through a slot 132 formed in front wall 136 of bag housing 12. A bulkhead wall 138 is secured to the interior of bag housing 12 in spaced relationship to front wall 136 to provide an enclosed space through which bowden wire E extends. Clamps 50 for bowden wire E may be secured to bulkhead 138 as desired.

In accordance with another aspect of the invention, housing for transmission D is formed in three housing sections J, K and L. Housing sections J and L are positioned in spaced-apart relationship on opposite sides of center housing section K. Housing sections J and L include bored bosses 140 and 142 having bearing means therein on which driven shaft 102 is rotatably journaled. Power takeoff discs 110 and 112 include integral gears 144 and 146 extending axially outward therefrom, and through suitable holes in sides 148 and 150 of center housing section K. Power takeoff discs 110 and 112, and gears 144 and 146, have centrally bored holes to receive driven shaft 102 therethrough. Power takeoff discs 110 and 112, and gears 144 and 146 are mounted for independent rotational movement relative to driven shaft 102.

Housing section J has a bore 152 therein for nonrotatably receiving pin 154 with a force fit. A large-diameter spur gear 156, integral with a smaller diameter spur gear 158, is rotatably mounted on pin 154. Spur gear 156 is normally continuously meshed with gear 144 so that gears 156 and 158 are rotatably driven when clutch disc 106 is in engagement with power takeoff disc 110.

Housing section L includes a bore 160 for nonrotatably receiving pin 162 with a force fit and an idler spur gear 164 is rotatably mounted on pin 162. Power takeoff gear 146 is normally constantly meshed with idler gear 164 so that idler 164 is rotatably driven when clutch disc 108 is in engagement with power takeoff disc 112. Housing section L further includes a bore 166 for nonrotatably receiving pin 168 in a force fit. A large-diameter gear 170, integral with smaller diameter gear 172, is rotatably mounted on pin 168. Idler gear 164 is normally constantly meshed with gear 170 so that gears 170 and 172 are rotatably driven.

Outer housing sections J and L are each provided with bored bosses 174 and 176 which are provided with sleeve bearings for rotatably mounting output shaft 178 therein. Output shaft 178 simply extends through suitable holes as at 180 in sideplates 148 and 150 of center housing section J. Output shaft 178 has spur gears 182 and 184 keyed thereto for rotation therewith. Spur gears 182 and 184 are normally engaged with small-diameter gears 158 and 172.

In operation of the device, shifting of clutch actuator 42 to the left in FIG. 4 causes clutch disc 106 to engage power takeoff disc 110. Clutch 40 is being constantly driven by driving connection with driven shaft 102 so that engagement between clutch disc 106 and power takeoff disc 110 rotates gear 144. In normal operation, pulley 34 and driven shaft 102 are driven in a counterclockwise direction as viewed from the left-hand end of FIG. 4. Gear 144 rotatably drives gear 156 which in turn drives gear 158, and gear 148 in turn drives gear 182 for rotating output shaft 178 in a counterclockwise direction as viewed from the left-hand end of FIG. 4. This provides propelling force to wheels 114 and 116 for propelling cleaner A in a forward direction. Movement of actuator 42 to the right in FIG. 4 causes engagement of clutch disc 108 with power takeoff disc 112 to rotatably drive gear 146. Gear 146 rotatably drives idler gear 164 which in turn drives gear 170. Gear 172 rotates with gear 170 and rotatably drives gear 184. Gear 184 is keyed on shaft 178 so that output shaft 178 is rotatably driven in a clockwise direction as viewed from the left-hand end of FIG. 4. The presence of an additional idler gear 164 in the second drive train reverses the drive direction of output shaft 178 so that wheels 114 and 116 provide propulsion to cleaner A in a rearward direction.

While materials do not constitute an important part of the present invention, housing sections J, K and L are die-cast from aluminum in a preferred arrangement. Also, power takeoff discs 110 and 112, along with gears 144 and 146, are formed of metal, such as aluminum while the remaining gears are molded of polyamide having graphite incorporated therein. In addition, the gears are preferably helical or spur gears, although friction gears could also be utilized.

It will be noted that center housing section K includes a bottom wall 190 so that bottom wall 190, along with sidewalls 148 and 150, cooperate to define a substantially U-shaped cradle between which clutch 40 and actuator 42 are positioned. Housing sections J, K and L all have holes, indicated by a single numeral 192, in their peripheries, and through which screws 194 may extend. Holes 192 in adjacent housing sections are aligned with one another when outer housing sections J and L are placed in contact with sidewalls 148 and 150 of center housing section K. Nuts 196 are threaded onto screws 194 to hold outer housing sections J and L to center housing section K.

In a preferred arrangement, bearings 202 and 204 are positioned within cylindrical recesses formed in bosses 140 and 142 on outer housing sections J and L for rotatably supporting driven shaft 102 as shown in FIG. 5. An additional nut 206 may be threaded on the end of driven shaft 102 opposite pulley 34 to fix shaft 102 axially in position relative to the housing.

Power takeoff disc 112, along with gear 146, are provided with an interior sintered bronze sleeve bearing 208 through which driven shaft 102 extends. Power takeoff discs 110 and gear 144 are similarly provided with a sleeve bearing 210. Therefore, power takeoff discs 110 and 112, which are integral with gears 144 and 146, are rotatably mounted on driven shaft 102 so that rotation of driven shaft 102 does not impart rotation to friction discs 110 and 112.

Thrust bearings 212 and 214 are positioned at the outer faces of gears 144 and 146 and bear against shoulders in the cylindrical recesses of outer housing sections J and L so that axial thrust imparted to friction discs 110 and 112 is taken by thrust bearings 212 and 214 acting against the outer faces of gears 144 and 146. Cylindrical felt seals 216 and 218 are provided around those portions of gears 144 and 146 adjacent power takeoff discs 110 and 112 for completely sealing the gear trains mounted on housing sections J and L from friction discs 106 and 108. A brake lining type of material in the form of discs 220 and 222 may be bonded to either clutch discs 106 and 108 or to power takeoff discs 110 and 112. In the preferred arrangement shown, friction discs 220 and 222 are bonded to power takeoff discs 110 and 112.

In operation of the device, dust and material worn from friction material 220 and 222 is prevented from entering the housing portions enclosing the driving gear trains. Housing sections J and L recessed to receive all of the gears therein so that the outer peripheral portions of housing sections J and L fit flush against the peripheral portions of sideplates 148 and 150 to completely seal against the outer faces of sidewalls 148 and 150 of center housing section K. Gaskets of cork or other material may be interposed between the peripheral contacting areas. This arrangement prevents dirt and other foreign material from entering the gear trains and interfering with their operation. The meshing driving arrangement of the first and second gear trains, when assembled in housing sections J and L, is shown in FIGS. 6 and 7.

In accordance with the invention, the clutch 40 and actuator mechanism includes a tubular sleeve 230 positioned on shaft 102. One end of sleeve 230 is exteriorly threaded as at 232 for threadably receiving clutch disc 106 which has a threaded bore 234 therein. The other end of sleeve 230 is provided with an axial notch 236 through which a pin 238 extends and is pressed in a radial hole 240 in a shaft 102. Threads 232 and 234 are right-hand threads so that when shaft 102 is normally driven counterclockwise as viewed from the left-hand end of FIG. 13, sleeve 230 is also driven counterclockwise along with clutch disc 106. Engagement of clutch disc 106 with power takeoff disc 110 normally tends to tighten threads 234 on threads 232. Notch 236 is elongated and pin 238 is positioned in the axial center thereof so that sleeve 230 may shift axially on shaft 102.

Friction disc 108 is defined by a pair of C-shaped segments 242 having their ends bent outwardly to define ears 244 and 246. An assembly member 248 has its flanges 250 and 252 spotwelded to the central portions of C-shaped members 242. Assembly member 248 has an outwardly deformed central portion 256 with a hole 258 into which keys 259 project and drivingly engage the edges of notch 236 in sleeve 230. Thus members 106, 230 and 108 rotate as a unit. Ears 244 and 246 are spaced apart from one another and the end portions of pin 238 extend between spaced-apart ears 244 and 246. Pin 238 extends through and freely clears notch 236. A C-ring 260 is received in a circumferential groove in sleeve 230 to hold clutch disc 108 thereon. Therefore, it will be seen that driven shaft 102 provides driving torque to clutch disc 108 by cooperation of pin 238 and spaced-apart ears 244 and 246 and clutch disc 108 drives clutch disc 106 through the keys 259 which are engaged in notches 236. Clutch discs 106 and 108 are therefore constantly driven.

The bearing structure 120 comprises a pair of thrust bearings 266 separated by an actuator disc 262 having a hole 264 therethrough receiving the sleeve 230. Actuator disc 262 is positioned on sleeve 230 intermediate clutch discs 106 and 108. Ball bearings 266 are positioned over sleeve 230 on opposite sides of actuator disc 262. A pair of cup-shaped members 268 are also received over sleeve 230 and receive ball bearings 266. Cup-shaped members 268 have tabs 270 extending therefrom for reception in notches 272 in the peripheral edge of actuator disc 262. Tabs 270 on one cup-shaped member 268 are positioned in every other notch 272 in actuator disc 262, and the other cup-shaped member has its tabs positioned in every other vacant notch in the peripheral edge of actuator disc 262. Tabs 270 are then deformed downwardly, substantially parallel to the plane of actuator disc 262, so that cup-shaped members 268 are retained on opposite sides of actuator disc 262 with ball bearings 266 trapped between cup-shaped members 268 and actuator disc 262.

Arms 122 projecting from disc 262 are received in substantially rectangular holes 124 formed in actuator 42, only one of which is shown in FIG. 9. Rectangular holes 124 have bumps 282 extending toward one another at substantially the axial center of the holes 124. Bumps 282 provide substantially point contact between actuator 42 and arms 122. Pin 118 is a force fit in a hole 284 formed in center housing section K, and upper and lower arms 286 and 288 of U-shaped actuator 42 have holes therein for receiving pin 118. Lateral pivoting movement of actuator 42 would normally cause some twisting movement of actuator disc 262 which would interfere with axial movement of sleeve 230 on shaft 102 and exert damaging concentrated forces on bearings 266. However, the point contact provided by bumps 282 in rectangular opening 280 provides a force acting on tabs 274 and 278 which is substantially axially of shaft 102 even though actuator 42 moves in an arcuate path rather than axially of shaft 102.

When the clutch actuator and clutch discs are assembled on sleeve 230 as shown in FIG. 5, there is a slight clearance between the circular flat face of clutch disc 106 and friction material 220, and between the flat circular face of clutch disc 108 and friction material 222. Therefore, rotation of shaft 102 normally leaves transmission B in a neutral position in which no driving force is supplied to wheels 114 and 116.

Lateral shifting movement of actuator 42 forces the assembly of actuator disc 262, bearings 266 and cup-shaped members 268 axially either to the right or the left of driven shaft 102. The outer faces of cup-shaped members 268 strike against either clutch disc 106 or 108 which causes axial shifting movement of sleeve 230 along driven shaft 102 until a clutch disc and a power takeoff disc engage one another with a normal force sufficient to provide propelling torque to wheels 114 and 116.

In operation of the device, pulley 34 is driven by belt 32 in a direction indicated by the arrows in FIG. 14. Movement of clutch actuator 42 to the left in FIG. 14 engages clutch disc 106 with power takeoff disc 110. Torque is then transmitted from shaft 102 through clutch disc 104 to power takeoff disc 110. Torque is then transmitted by gears 144, 156, 158 and 182 to shaft 178. This provides driving torque to wheels 114 and 116 for propelling cleaner A in a forward direction.

Figure 15:
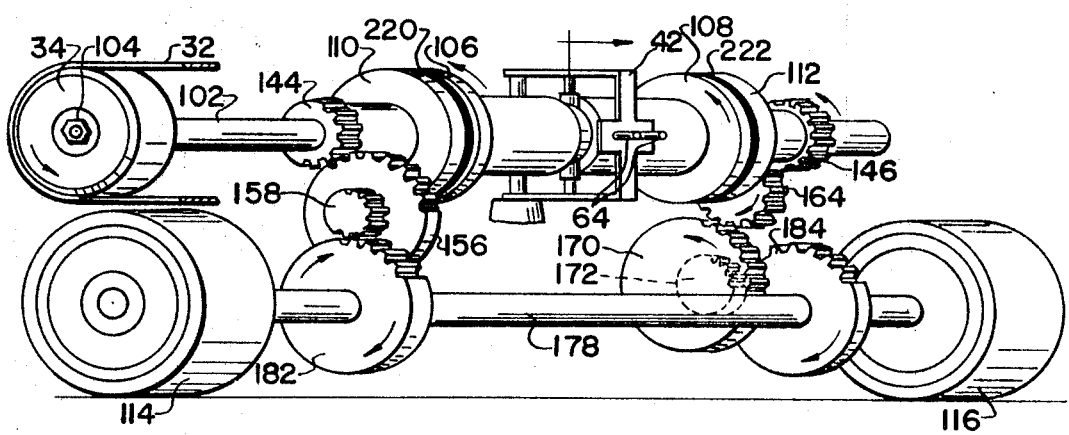
FIG. 15 is a diagrammatic perspective illustration showing the improved transmission of the present invention in a reverse driving condition.
Figure 16:
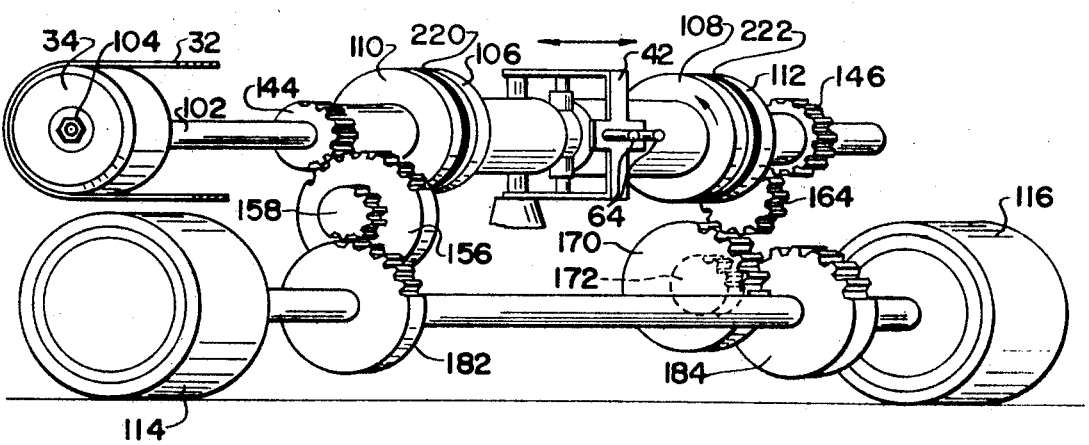
FIG. 16 is a diagrammatic perspective illustration showing the improved transmission of the present invention in a neutral condition.

Lateral shifting of actuator 42 to the right engages clutch disc 108 with power takeoff disc 112 and the parts are driven in the direction of the arrows shown in FIG. 15. Torque is transmitted via gears 146, 164, 170, 172 and 184 to output shaft 178. This drives wheels 114 and 116 in a reverse rotational direction to propel cleaner A in a rearward direction.

The absence of any force tending to move actuator 42 laterally to the left or the right provides insufficient normal force between clutch disc 106 and power takeoff disc 110, or between clutch disc 108 and power takeoff disc 112, so that the transmission is in a neutral position and no torque is transmitted through the clutch discs and power takeoff discs to provide driving torque to wheels 114 and 116.

The transmission of the present invention provides smooth and substantially effortless power-assisted propulsion of cleaner A. The manual propelling force supplied to cleaner A is multiplied several times by the mechanical advantage of lever 56 cooperating with handgrip 44, bowden wire E and actuator 42. The normal force between clutch discs 106 and 108, and power takeoff discs 110 and 112, is several times the manual force applied to handgrip 44, and the propelling force applied to cleaner A is at least several times that applied by pushing or pulling on handgrip 44. In normal operation, clutch discs 106 and 108, and power takeoff discs 110 and 112 always slip relative to one another, and a one-to-one ratio is not reached, so that smooth reversing and acceleration is achieved. The absence of force on handgrip 44, in either a forward or rearward direction, provides no normal force between friction clutch disc 106 and friction material 120, or between friction clutch disc 108 and friction material 122, so that propelling torque can be transmitted to wheels 114 and 116.

While the invention has been described with reference to a preferred embodiment, it is obvious that modifications and alternations will occur to others upon a reading and understanding of this specification.

We claim:

1. In a reversible transmission having rotatably mounted, spaced-apart, input and output shafts, the improvement comprising
   first and second power takeoff members positioned in axially spaced-apart relation on said input shaft for rotation relative thereto,
   clutch means positioned on said input shaft between said power takeoff means and unitarily rotatable with such shaft,
   first drive means connecting said first power takeoff member with said output shaft and providing for application of torque tending to rotate the latter in one direction upon application of torque to said first power takeoff member tending to produce rotation thereof in a predetermined direction,
   second drive means connecting said second power takeoff member with said output shaft and providing for application of torque tending to rotate the latter in the opposite direction upon application of torque to said second power takeoff member tending to produce rotation thereof in said predetermined direction,
   and means for selectively shifting said clutch means into engagement with either said first or second power takeoff member to selectively transfer torque from said input shaft to said output shaft through said clutch means and through either said first or second power takeoff member and its connected drive means.

2. The structure of claim 1 wherein said drive means is enclosed in a housing,
   wherein said input and output shafts are rotatably mounted in said housing in spaced, side-by-side relation,
   wherein said housing comprises first and second portions removably secured together in axially spaced relation, with said first housing portion in part enclosing said first drive means and with said second housing portion in part enclosing said second drive means,
   and wherein said housing further comprises a third portion intermediate said first and second housing portions and removably secured thereto for spacing purposes, said clutch means and said power takeoff members being disposed intermediate said first and second housing portions and outside said third housing portion thereby separating said clutch means and said power takeoff members from said drive means.

3. The structure of claim 1 wherein said clutch means provides opposed friction surfaces engageable with respective power takeoff members,
   wherein a nonrotatable force-applying member is interposed between said clutch means surfaces,
   and wherein antifriction thrust bearings are interposed between said force-applying member and respective clutch means surfaces.

4. The structure of claim 3 wherein said force-applying member is a disc with opposed, radially outwardly projecting ears each having opposed, flat thrust faces,
   wherein an actuator is pivoted adjacent said input shaft and has spaced arms adjacent respective member ears aforesaid,
   wherein said actuator arms are longitudinally slotted to receive such respective member ears,
   and wherein said actuator arm slots are in part defined by opposed, rounded abutments intermediate said actuator arm slot ends for engagement with adjacent thrust faces of respective force-applying member ears.

5. In a reversible transmission having rotatably mounted, spaced-apart, input and output shafts, the improvement comprising
   power takeoff means comprising a pair of power takeoff members positioned on one of said shafts in axially spaced-apart relation,
   first drive means connecting said first power takeoff member with said other shaft,
   second drive means connecting said second power takeoff member with said other shaft,
   clutch means positioned on said one shaft between said power takeoff members, said clutch means and said power takeoff members having facing, complementary friction surfaces and one of said clutch means and said power takeoff means being fixed for unitary rotation with said one shaft but being axially shiftable relative thereto and the other of said clutch means and said power takeoff means being freely rotatable on said one shaft,
   means for effecting axial movement of said one of the aforesaid power takeoff and clutch means to frictional engagement with the other to provide for the transfer of torque therebetween.
   and a housing supporting said input and output shafts and having spaced arm portions with said one shaft extending therebetween, such housing arm portions at least in part enclosing respective first and second drive means, and said power takeoff members and said clutch means being disposed exteriorly of said housing between said spaced arm portions thereof.

6. The device of claim 1 wherein said input shaft has projection means extending substantially radially therefrom between said first and second power takeoff member, said clutch means having circumferentially spaced-apart ear means thereon for receiving said projection means therebetween, said projection means engaging said ear means to continuously transfer torque from said input shaft to said clutch means through said projection means and said ear means.